United States Patent
Egan

(10) Patent No.: US 7,621,365 B2
(45) Date of Patent: Nov. 24, 2009

(54) TECHNIQUE FOR CONTROLLING VEHICLE FUNCTIONS

(76) Inventor: Thomas F. Egan, 570 Hance Rd., Binghamton, NY (US) 13903

( * ) Notice: Subject to any disclaimer, the term of this patent is extended or adjusted under 35 U.S.C. 154(b) by 262 days.

(21) Appl. No.: 11/067,493

(22) Filed: Feb. 28, 2005

(65) Prior Publication Data

US 2005/0217920 A1 Oct. 6, 2005

Related U.S. Application Data

(60) Provisional application No. 60/547,559, filed on Feb. 26, 2004, provisional application No. 60/582,793, filed on Jun. 28, 2004.

(51) Int. Cl.
*B62D 1/04* (2006.01)

(52) U.S. Cl. .................. 180/315; 280/771; 74/552; 200/61.57

(58) Field of Classification Search .......... 280/771; 180/315, 320, 333, 334; 200/61.54, 61.56, 200/61.57; 74/552, 553, 557
See application file for complete search history.

(56) References Cited

U.S. PATENT DOCUMENTS

| | | | | | |
|---|---|---|---|---|---|
| 4,884,057 | A | * | 11/1989 | Leorat | 340/456 |
| 5,289,736 | A | * | 3/1994 | Fujimori | 74/557 |
| 5,359,164 | A | * | 10/1994 | Kucharski, Jr. | 200/315 |
| 5,520,071 | A | * | 5/1996 | Jones | 74/557 |
| 5,603,674 | A | * | 2/1997 | Rivas et al. | 477/170 |
| 5,707,262 | A | * | 1/1998 | Huntley et al. | 440/53 |
| 6,108,871 | A | * | 8/2000 | Weakland et al. | 16/441 |
| 6,151,987 | A | * | 11/2000 | Porter | 74/557 |
| 6,161,449 | A | * | 12/2000 | Fujimori | 74/557 |
| 6,799,488 | B2 | * | 10/2004 | Snell | 74/552 |
| 7,204,338 | B2 | * | 4/2007 | Katae et al. | 180/315 |

FOREIGN PATENT DOCUMENTS

| | | | | |
|---|---|---|---|---|
| AU | 9859450 | A | * | 9/1998 |
| GB | 2 261 936 | A | * | 6/1993 |
| GB | 2 363 836 | A | * | 1/2002 |
| JP | 2-288117 | A | * | 11/1990 |
| JP | 4-356272 | A | * | 12/1992 |
| JP | 11-56011 | A | * | 3/1999 |
| JP | 2001-039317 | A | * | 2/2001 |
| WO | WO 03/047914 | A1 | * | 6/2003 |

\* cited by examiner

*Primary Examiner*—Ruth Ilan

(57) ABSTRACT

A technique for controlling vehicle functions is disclosed. In one particular exemplary embodiment, the technique may be realized as an apparatus for controlling vehicle functions. Such an apparatus may comprise a support member configured to attach to a steering wheel of a vehicle, a switch assembly fixedly attached to the support member for electrically controlling functions of the vehicle, and a prosthetic steering device rotatably attached to the support member for manually controlling steering of the vehicle. In an alternative exemplary embodiment, such an apparatus may comprise a support member configured to attach to a steering wheel of a vehicle, and a prosthetic device rotatably attached to the support member for manually controlling steering of the vehicle, wherein the prosthetic device has a switch assembly for electrically controlling functions of the vehicle.

21 Claims, 4 Drawing Sheets

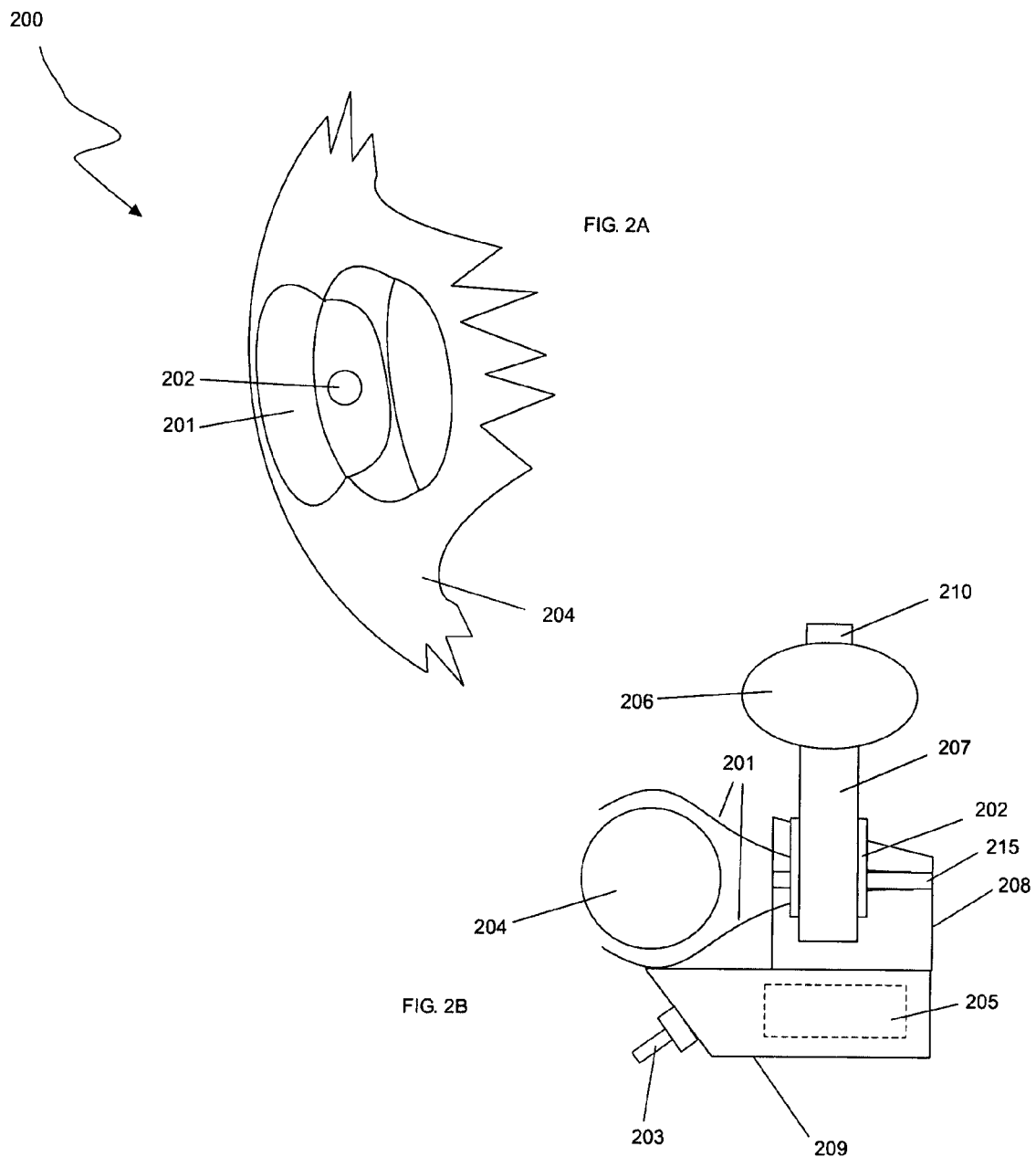

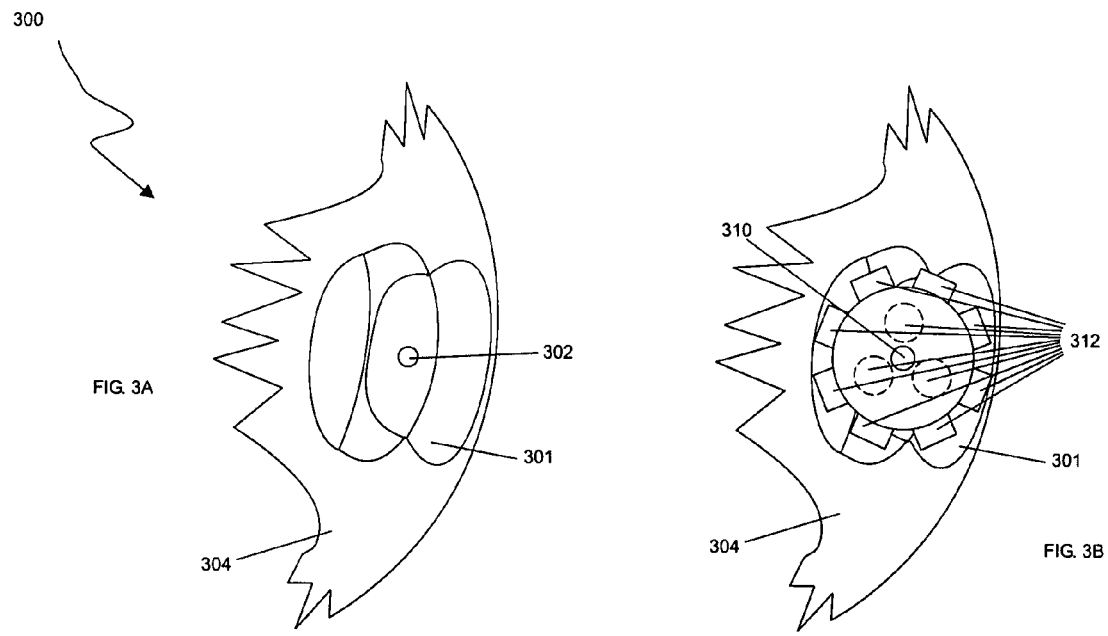
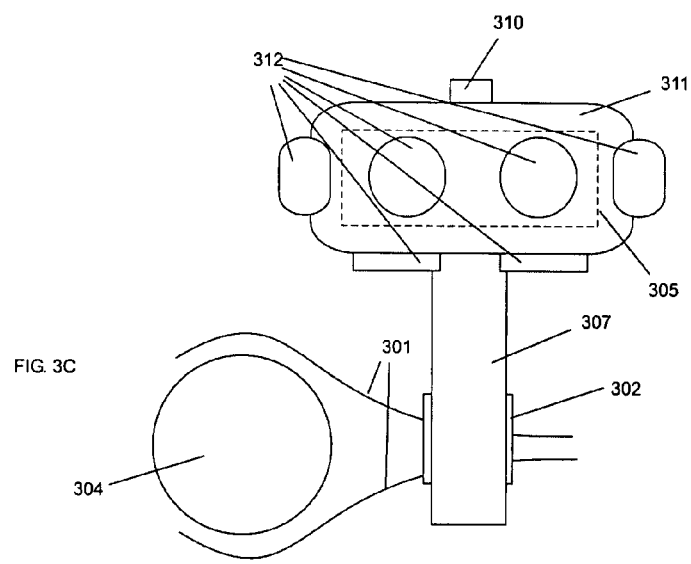

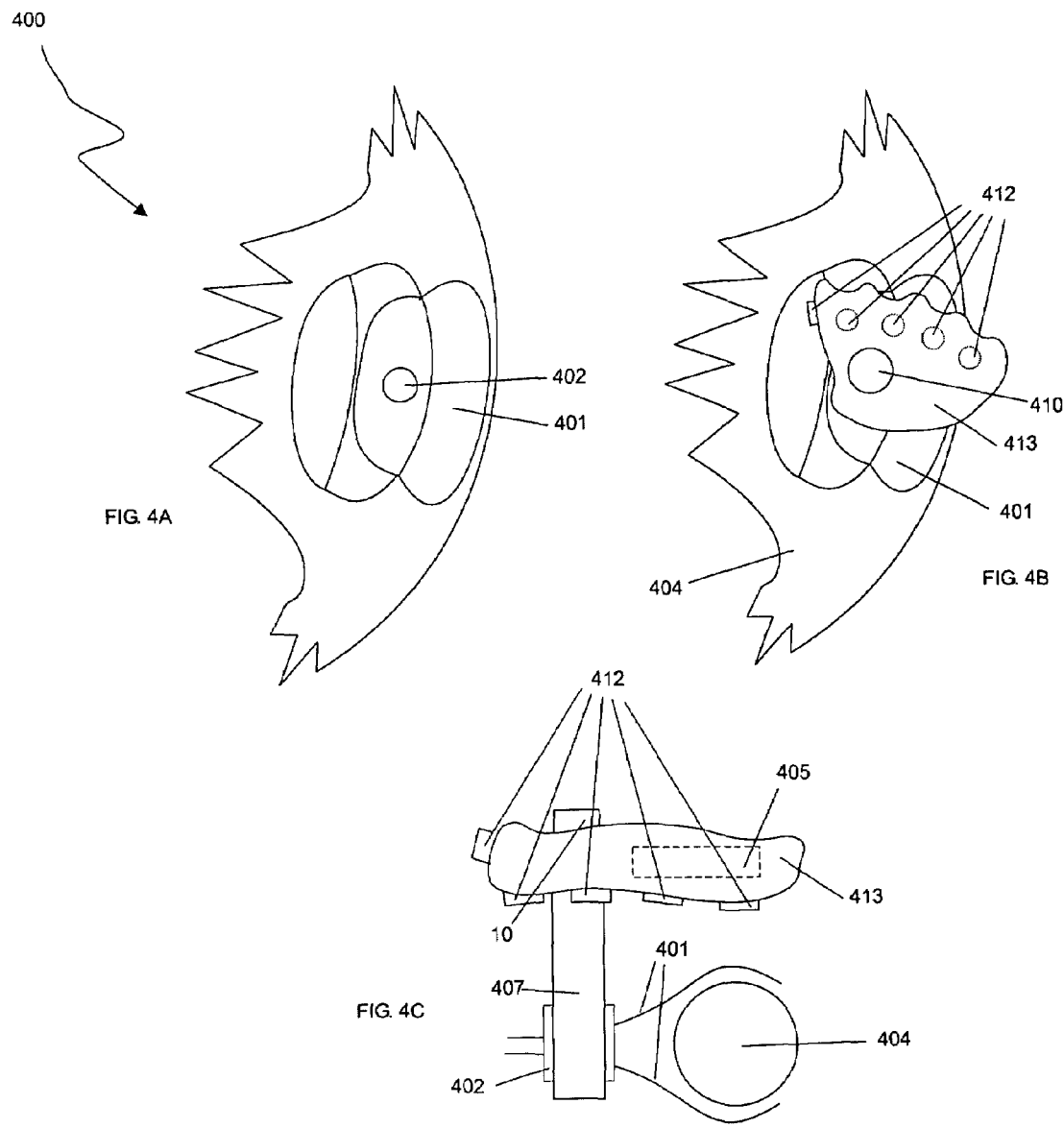

TECHNIQUE FOR CONTROLLING VEHICLE FUNCTIONS

CROSS-REFERENCE TO RELATED APPLICATIONS

This patent application claims priority to U.S. Provisional Patent Application No. 60/547,559, filed Feb. 26, 2004, and to U.S. Provisional Patent Application No. 60/582,793, filed Jun. 28, 2004, each of which is hereby incorporated by reference herein in its entirety.

FIELD OF THE DISCLOSURE

The present disclosure relates generally to a technique for controlling vehicle functions and, more particularly, to the specific needs of disabled motorists who, due to disability and subsequent driving equipment configurations, may only have one hand available both for controlling a steering wheel of a vehicle and activating other important vehicle functions.

BACKGROUND OF THE DISCLOSURE

Difficulties are often encountered when a disabled person without full use of at least one leg/foot and two hands wishes to drive an automobile. Typically, a foot or two feet will control brake and gas, a first hand continually remains on the steering wheel, and a second hand is available to control other important functions which are necessary during the driving process (e.g., turn signals, dimmers, wipers, etc.). Although many important vehicle functions have been relocated to a vehicle steering wheel for easy access by non-disabled drivers, this does not serve the needs of disabled motorists who require an ergonomic prosthetic steering interface integrated with vehicular controls.

There have been some inventive efforts directed at alleviating the problems associated with controlling vehicle functions in conjunction with a prosthetic steering device. For example, Access Unlimited in the United States manufactures and distributes a product which provides an array of switches located inboard of the axis of a prosthetic steering device on a panel which is fixed to a steering wheel. DSI Corporation in the United States also distributes a similar product. Another European manufacturer has a steering device with switches located at the top of a steering knob, primarily for operation by a thumb.

The aforementioned devices allow a disabled person to control vehicular functions while controlling a vehicle steering wheel. However, the aforementioned devices, as well as other known devices, have drawbacks in the area of ergonomics which limit the potential safety and ease-of-use for a disabled driver. For example, for some drivers, the location of buttons on a panel that is affixed directly to and moves with a vehicle steering wheel can be a disadvantage, as the natural result of this configuration is that important controls continually change position with respect to a controlling hand as the steering wheel rotates throughout its 360 degree rotation. This is particularly the case for clients with cognitive impairments.

Although at least one device is currently available which includes switches on top of a prosthetic steering device, this is often ergonomically difficult to operate, due to the awkward resulting angle of a driver's wrist and the inappropriateness for operation by any digit other than a driver's thumb. Others who are easily able to access a fixed switch panel that rotates with a vehicle steering wheel may experience difficulties accessing an array of switches which is located substantially inboard towards the center of the steering wheel compared to the axis of a spinner knob, as is the case with most commonly available devices in the field.

In view of the foregoing, it would be desirable to provide a switching device for controlling vehicular functions which is functionally integrated with a prosthetic steering device and which overcomes the above-described inadequacies and shortcomings.

SUMMARY OF THE DISCLOSURE

A technique for controlling vehicle functions is disclosed. In one particular exemplary embodiment, the technique may be realized as an apparatus for controlling vehicle functions. Such an apparatus may comprise a support member configured to attach to a steering wheel of a vehicle, a switch assembly fixedly attached to the support member for electrically controlling functions of the vehicle, and a prosthetic steering device rotatably attached to the support member for manually controlling steering of the vehicle. In an alternative exemplary embodiment, such an apparatus may comprise a support member configured to attach to a steering wheel of a vehicle, and a prosthetic device rotatably attached to the support member for manually controlling steering of the vehicle, wherein the prosthetic device has a switch assembly for electrically controlling functions of the vehicle. Additional alternative exemplary embodiments may also be realized.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 2A is a top view of a device for controlling automotive functions and a steering device, with the steering device removed, in accordance with a front-of-steering-wheel mounted configuration, in accordance with an alternative embodiment of the present disclosure.

FIG. 2B is a side view of the device shown in FIG. 2A with the steering device (in this case a prosthetic steering knob) in place, in accordance with an alternative embodiment of the present disclosure.

FIG. 3A is a top view of a device for controlling automotive functions and a steering device, with the steering device removed, in accordance with an alternative embodiment of the present disclosure.

FIG. 3B is a top view of the device shown in FIG. 3A with the steering device (in this case an Ergo-Grip knob prosthetic steering device) in place, in accordance with an alternative embodiment of the present disclosure.

FIG. 3C is a side view of the device shown in FIG. 3A with the steering device (in this case an Ergo-Grip knob prosthetic steering device) in place, in accordance with an alternative embodiment of the present disclosure.

FIG. 4A is a top view of a device for controlling automotive functions and a steering device, with the steering device removed, in accordance with an alternative embodiment of the present disclosure.

FIG. 4B is a top view of the device shown in FIG. 4A with the steering device (in this case an Ergo-Grip fist-grip prosthetic steering device) in place, in accordance with an alternative embodiment of the present disclosure.

FIG. 4C is a side view of the device shown in FIG. 4A with the steering device (in this case an Ergo-Grip fist-grip prosthetic steering device) in place, in accordance with an alternative embodiment of the present disclosure.

DETAILED DESCRIPTION OF EXEMPLARY EMBODIMENTS

Figure 1A:
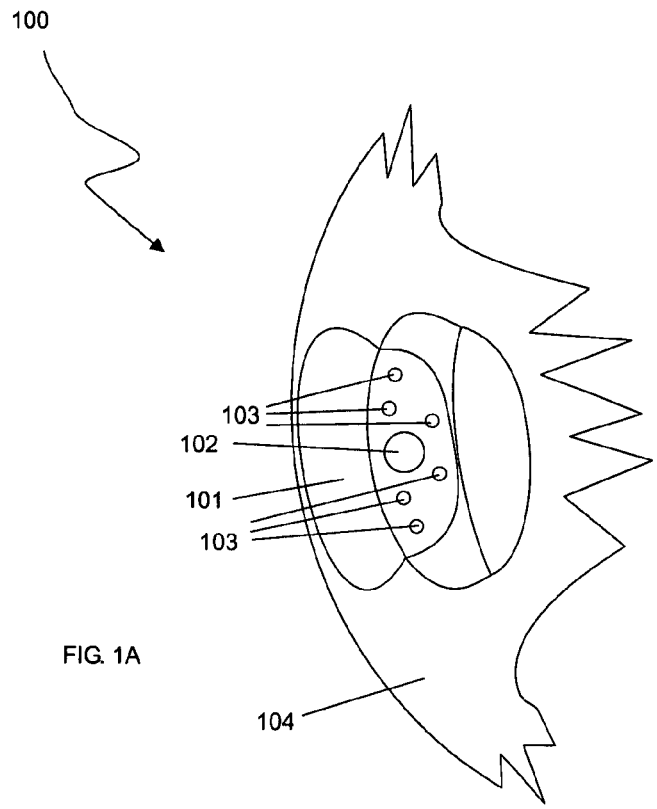
FIG. 1A is a top view of a device for controlling automotive functions and a steering device, with the steering device removed, in accordance with an embodiment of the present disclosure.
Figure 1B:
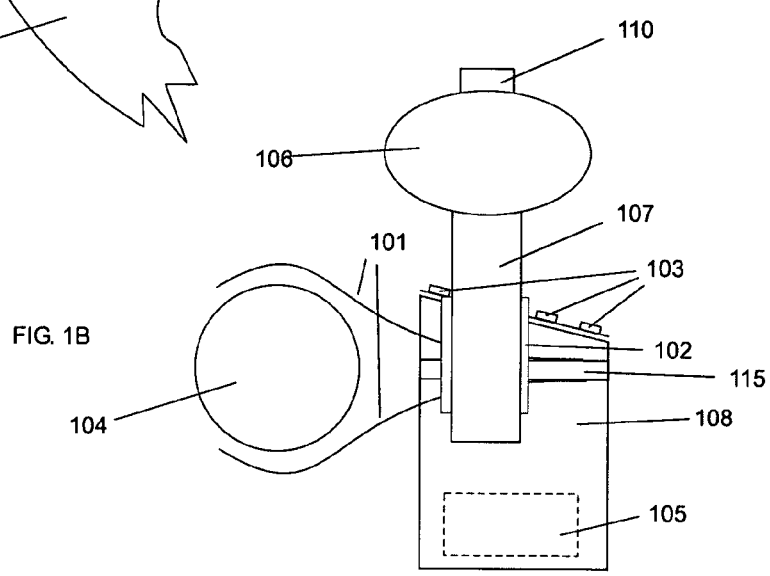
FIG. 1B is a side view of the device shown in FIG. 1A with the steering device (in this case a prosthetic steering knob) in place, in accordance with an embodiment of the present disclosure.

Referring to FIGS. 1A and 1B, there is shown a steering wheel-mounted prosthetic steering device and switching device 100 for controlling automotive functions in accordance with an embodiment of the present disclosure. Beginning from the bottom of the apparatus 100 upward, the apparatus 100 is secured by two mounting brackets 101 as a means of first support for securely mounting the apparatus 100 to an automotive steering wheel 104. The mounting brackets 101 support a round receiver tube 102 to stabilize and allow rotation of main vertical pin 107 (FIG. 1B). The two mounting brackets 101 securely clamp a single cross-member 115 which in turn supports enclosure 108 in a manner that allows for easy dismantling/assembly of apparatus 100. This configuration allows switch array 103 to be easily located on top of enclosure 108 without interference from mounting hardware, etc. Control circuitry 105 for switch array 103 is located in a bottom of enclosure 108. The main vertical pin 107 is removable from mounting brackets 101 by means of pressing a release button 110. The main vertical pin 107 rotates freely within receiver tube 102 as a means to rotate the steering wheel 104. The main vertical pin 107 supports prosthetic steering device 106, shown in this configuration as a knob, but which can take many forms appropriate for the needs of a particular user.

Referring to FIGS. 2A-2B, there is shown a steering wheel-mounted prosthetic steering device and switching device 200 for controlling automotive functions, in accordance with a front-of-steering-wheel mounted configuration, in accordance with an alternative embodiment of the present disclosure. Beginning from the bottom of the apparatus 200 upward, the apparatus 200 is secured by two mounting brackets 201 as a means of first support for securely mounting the apparatus 200 to an automotive steering wheel 204. The mounting brackets 201 support a round receiver tube 202 to stabilize and allow rotation of main vertical pin 207 (FIG. 2B). The two mounting brackets 201 securely clamp a single cross-member 215 which in turn supports enclosure 208 and enclosure 209 in a manner that allows for easy dismantling/assembly of apparatus 200. This configuration allows switch array 203 to be easily located beneath the steering wheel 204 on an outboard side of enclosure 209 without interference from mounting hardware, etc. Control circuitry 205 for switch array 203 is located in enclosure 209. The main vertical pin 207 is removable from mounting brackets 201 by means of pressing a release button 210. The main vertical pin 207 rotates freely within receiver tube 202 as a means to rotate the steering wheel 204. The main vertical pin 207 supports prosthetic steering device 206, shown in this configuration as a knob, but which can take many forms appropriate for the needs of a particular user.

Referring to FIGS. 3A-3C, there is shown a steering wheel-mounted prosthetic steering device and switching device 300 for controlling automotive functions, in accordance with an Ergo-Grip knob prosthetic steering device configuration, in accordance with an alternative embodiment of the present disclosure. Beginning from the bottom of the apparatus 300 upward, the apparatus 300 is secured by two mounting brackets 301 as a means of first support for securely mounting the apparatus 300 to an automotive steering wheel 304. The mounting brackets 301 support a round receiver tube 302 to stabilize and allow rotation of main vertical pin 307 (FIG. 3C). The main vertical pin 307 is removable from mounting brackets 301 by means of pressing a release button 310. The main vertical pin 307 rotates freely within receiver tube 302 as a means to rotate the steering wheel 304. The main vertical pin 307 supports Ergo-Grip knob 311, which in turn serves as a support and enclosure for switch array 312 and control circuitry 305. It should be noted that although FIG. 3C depicts switches located both in the sides and on the bottom of Ergo-Grip knob 311, they can also be located on top of the unit.

Referring to FIGS. 4A-4C, there is shown a steering wheel-mounted prosthetic steering device and switching device 400 for controlling automotive functions, in accordance with an Ergo-Grip fist-grip prosthetic steering device configuration, in accordance with an alternative embodiment of the present disclosure. Beginning from the bottom of the apparatus 400 upward, the apparatus 400 is secured by two mounting brackets 401 as a means of first support for securely mounting the apparatus 400 to an automotive steering wheel 404. The mounting brackets 401 support a round receiver tube 402 to stabilize and allow rotation of main vertical pin 407 (FIG. 4C). The main vertical pin 407 is removable from mounting brackets 401 by means of pressing a release button 410. The main vertical pin 407 rotates freely within receiver tube 402 as a means to rotate the steering wheel 404. Main vertical pin 407 supports Ergo-Grip fist-grip 413, which in turn serves as a support and enclosure for switch array 412 and control circuitry 405. It should be noted that although FIG. 4C depicts switches located both in the sides and on the bottom of Ergo-Grip fist-grip 413, they can also be located on top of the unit. It should be further noted that Ergo-Grip fist-grip 413 is contoured with indentations and formed to be ergonomically correct for the human hand.

For the purposes of better understanding the present disclosure, the orientation "side" shall refer, for example, to the left and right sides in the orientations shown in FIGS. 1A, 2A, 3A, 3B, 4A, and 4B. Positions towards the center of steering wheel 104, 204, 304, 404, shall generally be referred to as "inboard" and positions away from the center of steering wheel 104, 204, 304, 404, shall be referred to as "outboard". The terms "top" and "bottom" shall refer, for example, to the orientation in FIGS. 1B, 2B 3C, and 4C. FIGS. 1B, 2B, 3C, and 4C, reflect views as shown in FIGS. 1A, 2A, 3A, 3B, 4A, and 4B, respectively, however are depicted as a cutaway view from the top as a viewer would look down from the top of steering wheel 104, 204, 304, 404, in an area generally occupied by a Windshield on most current automobiles, referred to in this filing as a "side view". Positions closer to a driver with respect to the principal plane of steering wheel 104, 204, 304, 404, shall generally be referred to as "top", and positions farther from a driver with respect to the principal plane of steering wheel 104, 204, 304, 404, shall generally be referred to as "bottom".

In summary, the present disclosure discloses a switching device for controlling vehicular functions which is functionally integrated with a steering wheel-mounted prosthetic steering device. The combined apparatus is primarily provided for assisting persons with disabilities in controlling vehicle functions as well as steering while driving. The present disclosure has two primary groups of two subvariants. The first group of two subvariants comprises a first support means for attachment to the steering wheel of a vehicle, a second support means for attachment of an array of switches for controlling vehicular functions, and a rotating prosthetic device with a pin designed to seat and rotate within the first support means during the steering process. The second group of two subvariants comprises a first support means for attachment to the steering wheel of the vehicle, and a rotating prosthetic device which comprises an array of switches for controlling vehicular functions, designed to seat and rotate within the first support means during the steering process. Thus, the present disclosure contemplates at least four versions. First, there is an Ergo-Grip knob configuration, wherein switches are embedded directly in the sides and bottom of a prosthetic steering device. Second, there is an Ergo-Grip fist-grip configuration, wherein switches are embedded directly in the sides and bottom of a prosthetic steering device and the unit is molded to fit ergonomically into the palm of a user's hand. Third, there is a version wherein an array of switches may be incorporated above, below, and possibly to each side of an axis of the prosthetic steering device. Fourth, there is a front-of-steering-wheel version, wherein switches are mounted on a panel opposite a driver with respect to a steering wheel. A user may simply press an appropriate switch button to activate an appropriate control function of their vehicle.

In accordance with further aspects of the present disclosure, the switching device and/or control circuitry may include a variety of devices and technologies including, but not limited to, light switches, electrical switches, membrane switches, pneumatic switches, proximity sensors, electromagnetic and heat sensors. All of these switching devices have in common that they may sense the presence of a finger or part of a human body in a particular area. The switching device and/or control circuitry may interface with a vehicle and may include, but is not limited to, radio frequency, optical conductors, direct wiring, infrared and sound.

In accordance with still further aspects of the present disclosure, the main pin and receiver thereof may be fixed or removable.

In accordance with still further aspects of the present disclosure, a prosthetic steering device may be removable by means of pressing a button located on the prosthetic steering device rather than in the first means of support for attachment to a steering wheel. This feature would alleviate the difficulties of access for persons with limited finger dexterity, as well as design difficulties in the location of a button for releasing the prosthetic steering device located in close proximity to structural members of the steering wheel, switches, or the structure of a portion of the device fixed directly to the steering wheel.

In accordance with still further aspects of the present disclosure, the switch arrays may alternatively incorporate a light or series of lights to illuminate each switch, thus aiding a user in locating and identifying switches under low-light conditions.

In accordance with still further aspects of the present disclosure, a switch panel may be located between the first support means for attachment to the steering wheel and the prosthetic steering device, with a hole or slot to allow passage of an axle of the prosthetic steering device. This feature would allow locating the switch array panel in close proximity to the prosthetic steering device, without interference from mounting hardware such as bolts, nuts, structure, etc. whose purpose is to clamp the first means of support to the steering wheel.

In accordance with still further aspects of the present disclosure, in the Ergo-Grip knob steering device configuration and the Ergo-Grip fist grip configuration, control switches may be located on top of, on the bottom of, or on the sides of, the prosthetic steering device. This feature is an important design advantage, particularly in the case of switch location on the side or bottom of the steering device. The need for natural placement of fingers of a human hand and the strict requirements for full grasp and thus steering wheel control are all met with the placement of the control switches on the sides and bottom.

In accordance with still further aspects of the present disclosure, the enclosure containing the control circuitry may incorporate a means of support which is firmly attached to the first means of support to the steering wheel.

In accordance with still further aspects of the present disclosure, the switch panel in the front-of-steering-wheel mounted configuration may be located at a bottom of the first support means for attachment to the steering wheel. This feature would allow locating the switch array on a side of the steering wheel opposite a user, but still in close proximity to the prosthetic steering device, without interference from steering wheel structure, etc., due to space or other constraints.

The present disclosure is typically directed to disabled persons to allow operation of vehicle functions, but can also be used by non-disabled persons wishing to control a vehicle using a prosthetic steering device such as a knob or other interface.

The present disclosure is typically directed to disabled persons to allow operation of automotive vehicle functions, but can also be applied to operate other types of equipment such as boats, heavy equipment, farm equipment, trucks, carts, airplanes, or other self-propelling vehicles requiring human steering input.

Accordingly, the present disclosure is typically directed to a steering wheel-mounted prosthetic steering device and switching device for controlling automotive functions, designed for use by persons with disabilities who need to steer and control other automotive functions with a single hand. Such other automotive functions may include brake, acceleration, turn signals, wipers, dimmer, horn, windows, cruise control, and other functions which a driver may wish to control.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure can be beneficially implemented in any number of environments for any number of purposes. Accordingly, the claims set forth below should be construed in view of the full breadth and spirit of the present disclosure as described herein.

The invention claimed is:

1. An apparatus for controlling vehicle functions, the apparatus comprising:
   support means configured to attach to a steering wheel of a vehicle;
   a switch assembly attached to the support means for electrically controlling functions of the vehicle; and
   a prosthetic steering device rotatably attached to the support means for manually controlling steering of the vehicle;
   wherein the switch assembly is disposed opposite the support means from the prosthetic steering device.

2. The apparatus of claim 1, wherein the prosthetic steering device comprises a pin, and wherein the support means comprises a tube for receiving and allowing rotation of the pin.

3. The apparatus of claim 2, wherein the prosthetic steering device has a control mechanism located directly on the prosthetic steering device for controlling a release mechanism for releasing the prosthetic steering device from rotatable attachment to the support means.

4. The apparatus of claim 3, wherein the pin is removable from the tube via the release mechanism.

5. The apparatus of claim 1, wherein the switch assembly communicates with the vehicle via a wireless radio frequency interface for electrically controlling multiple functions of the vehicle.

6. The apparatus of claim 1, wherein the switch assembly comprises illumination means for illuminating one or more control switches for electrically controlling functions of the vehicle.

7. The apparatus of claim 1, wherein the support means is configured to removably attach to the steering wheel of the vehicle.

8. The apparatus of claim 1, wherein the switch assembly comprises an enclosure for housing control circuitry for electrically controlling functions of the vehicle.

9. The apparatus of claim 8, wherein the enclosure supports a switch array on a periphery thereof for providing control signals to the control circuitry.

10. An apparatus for controlling vehicle functions, the apparatus comprising:
    support means configured to attach to a steering wheel of a vehicle; and
    a prosthetic device rotatably attached to the support means for manually controlling steering of the vehicle, the prosthetic device having a switch assembly with a plurality of switches for electrically controlling functions of the vehicle, at least one of the plurality of switches being disposed on a bottom surface of the prosthetic device such that a user of the apparatus may engage the switch with at least one finger of a hand while a palm of the hand is engaged against a top surface of the prosthetic device.

11. The apparatus of claim 10, wherein the prosthetic device comprises a pin, and wherein the support means comprises a tube for receiving and allowing rotation of the pin.

12. The apparatus of claim 11, wherein the prosthetic steering device has a control mechanism located directly on the prosthetic steering device for controlling a release mechanism for releasing the prosthetic steering device from rotatable attachment to the support means.

13. The apparatus of claim 12, wherein the pin is removable from the tube via the release mechanism.

14. The apparatus of claim 10, wherein the prosthetic device comprises a knob for housing control circuitry of the switch assembly for electrically controlling functions of the vehicle.

15. The apparatus of claim 10, wherein the prosthetic device comprises an ergonomic grip for housing control circuitry of the switch assembly for electrically controlling functions of the vehicle.

16. The apparatus of claim 10, wherein the switch assembly communicates with the vehicle via a wireless radio frequency interface for electrically controlling multiple functions of the vehicle.

17. The apparatus of claim 10, wherein the switch assembly comprises illumination means for illuminating one or more control switches for electrically controlling functions of the vehicle.

18. The apparatus of claim 10, wherein the support means is configured to removably attach to the steering wheel of the vehicle.

19. An apparatus for controlling vehicle functions, the apparatus comprising:
    support means configured to attach to a steering wheel of a vehicle;
    a switch assembly attached to the support means for electrically controlling functions of the vehicle; and
    a prosthetic steering device rotatably attached to the support means for manually controlling steering of the vehicle;
    wherein the switch assembly comprises a switch array for electrically controlling multiple functions of the vehicle, wherein the switch array is disposed opposite the support means from the prosthetic steering device.

20. An apparatus for controlling vehicle functions, the apparatus comprising:
    support means configured to attach to a steering wheel of a vehicle; and
    a prosthetic device rotatably attached to the support means for manually controlling steering of the vehicle, the prosthetic device having a switch assembly with at least one switch for electrically controlling functions of the vehicle, at least one of the at least one switch being disposed on a bottom surface of the prosthetic device such that a user of the apparatus may engage the switch with at least one finger of a hand while a palm of the hand is engaged against a top surface of the prosthetic device.

21. The apparatus of claim 20, wherein the prosthetic device has a control mechanism located directly on the prosthetic device for controlling a release mechanism for releasing the prosthetic device from rotatable attachment to the support means.

* * * * *